United States Patent [19]

Diffrient

[11] Patent Number: 4,867,610
[45] Date of Patent: Sep. 19, 1989

[54] QUICK CONNECT DEVICE FOR TABLE LEG

[75] Inventor: Niels Diffrient, Ridgefield, Conn.

[73] Assignee: Howe Furniture Corporation, Trumbull, Conn.

[21] Appl. No.: 252,735

[22] Filed: Sep. 30, 1988

[51] Int. Cl.$^4$ .............................................. F16B 9/02
[52] U.S. Cl. .................................. 403/199; 108/157; 248/188; 411/54; 411/60
[58] Field of Search ............... 403/324, 374, 199, 263, 403/248, 277; 248/188, 412; 108/150, 157, 159; 411/44, 54, 55, 57, 60

[56] References Cited

U.S. PATENT DOCUMENTS

| | | | |
|---|---|---|---|
| 3,131,899 | 5/1964 | Luhrs | 403/199 X |
| 3,391,660 | 7/1968 | Stewart | 108/150 X |
| 4,416,048 | 11/1983 | Otte | 411/50 X |
| 4,723,578 | 2/1988 | Mordaraski et al. | 138/89 X |

Primary Examiner—Andrew V. Kundrat
Assistant Examiner—Arlen L. Olsen
Attorney, Agent, or Firm—Parmelee, Bollinger & Bramblett

[57] ABSTRACT

The invention comprises a quick disconnect apparatus for locking a tubular table leg to a table top. An insert plug extends downwardly below the table top and carries an annular resilient member which is inserted into the table leg. An actuator has a camming surface and is movable between two positions. In one position, it pulls the resilient member into forceful engagement with a ramped lower extension of the plug, causing the resilient member to expand and frictionally engage the inner surface of the leg, locking it in place. In its other position, the actuator releases the resilient member, causing it to relax and disengage from the leg.

13 Claims, 4 Drawing Sheets

4,867,610

QUICK CONNECT DEVICE FOR TABLE LEG

TECHNICAL FIELD

This invention relates to the field of table construction. More particularly, it pertains to a device for rapidly connecting or disconnecting a table leg and a table top.

BACKGROUND ART

The conventional method of attaching legs to table tops is to employ permanent methods such as glue, dowels, screws, or brackets. It is a primary object of this invention to provide a mechanism wherein a table leg may be connected to, or disconnected from, a table top rapidly and with a simple stroke of a hammer. Another object is to provide such a mechanism wherein the connection of the leg to the table top is very rigid. Other objects, features, and advantages will become apparent from the following description and appended claims.

DISCLOSURE OF INVENTION

The invention includes a base member which is mounted to the underside of a table top. The base member carries a substantially annular resilient locking member which is insertable into the tubular top end of a table leg where it lies in proximity to the inner surface of the table leg. Means are provided for selectively expanding the locking member outwardly and into tight frictional engagement with the inner surface of the table leg or, alternatively, relaxing the locking member to release the leg.

BEST MODE FOR CARRYING OUT THE INVENTION

Figure 1:
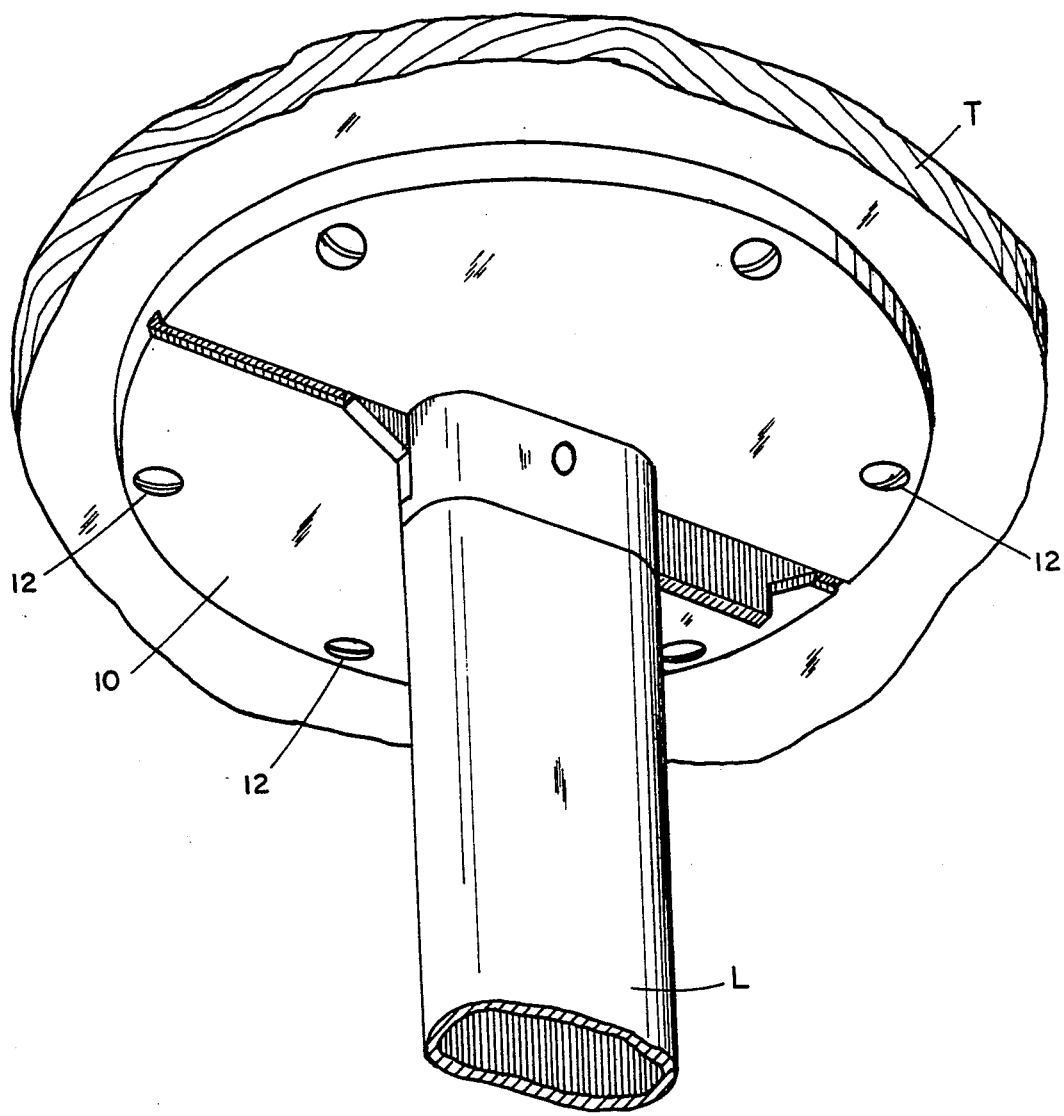
FIG. 1. is a perspective view of a table leg connected to a table top by the apparatus of this invention, both the leg and the table top being shown partially broken away.
Figure 2:
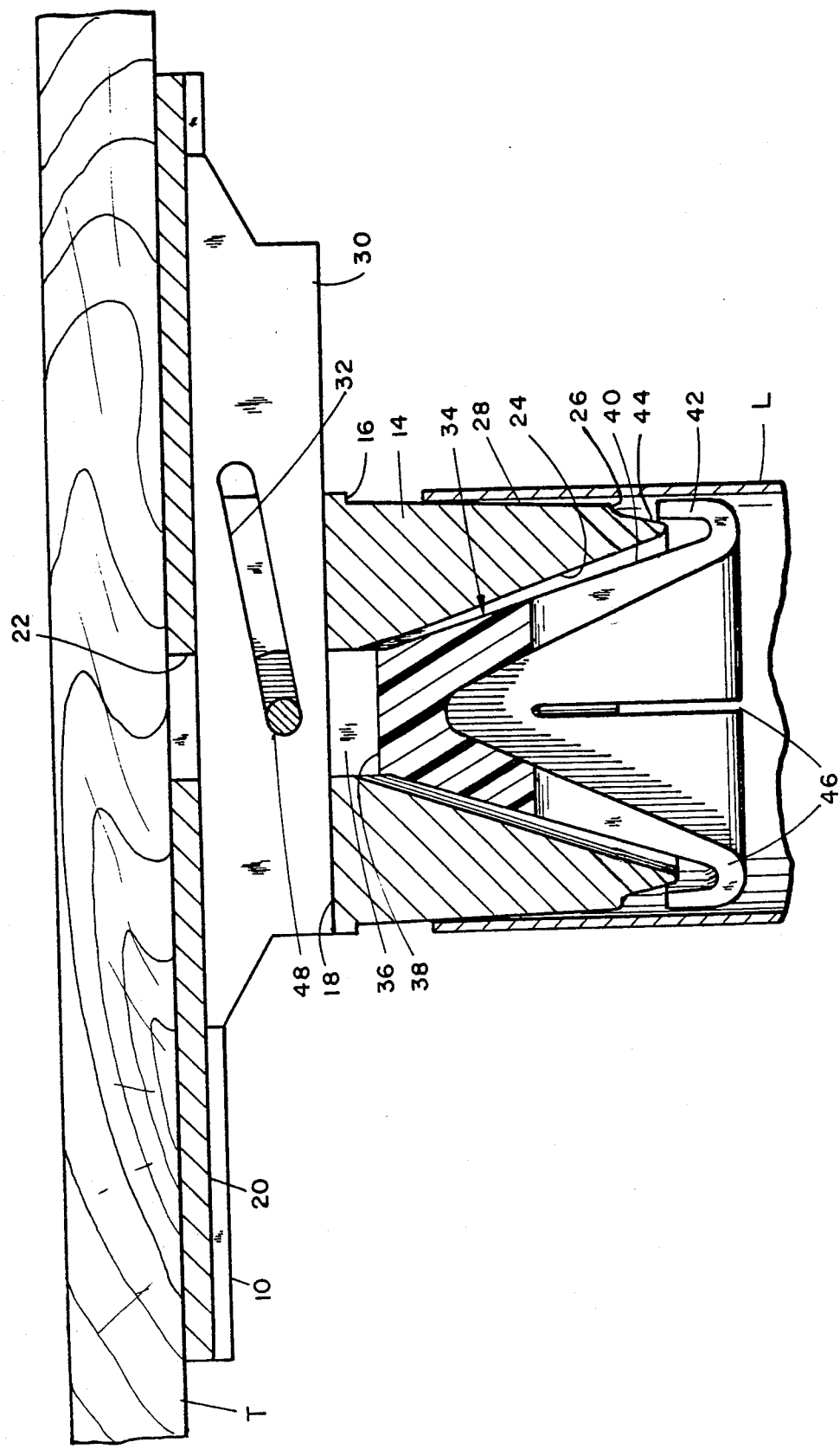
FIG. 2 is an enlarged cross-section taken through the apparatus of FIG. 1 and showing the apparatus in the released condition, with the leg partially removed.

FIG. 1 illustrates a tubular metal table leg L connected to a table top T by the apparatus of this invention. This apparatus comprises a base plate 10 which, in the illustrated embodiment, is round and is secured to the underside of the table top by means of screws 12. Extending downwardly from the base plate 10 is a plug insert 14 (FIG. 2). The plug insert 14 may have a slight taper and its outer shape matches the inner surface of the tubular leg L. A shoulder 16 around the plug insert 14 is substantially the thickness of the wall of the tubular leg L.

A channel 18 of rectangular cross-section extends diametrically through the plug insert 14 and its upper end continues along the base plate 10 as a groove 20. Extending through the base plate 10 and its plug insert 14 is an opening which forms a central recess 22 adjacent the table top, but flares outwardly to form a conical inner surface 24 within the body of the plug insert 14. The lower end of the plug insert 14 has an annular shoulder 26 around its outer surface 28. Below the annular shoulder 26 is an extension with an outer surface or "ramp" 44 having a greater degree of taper than that of the main body of the plug insert 14. As used herein and in the appended claims, the term "conical" is not limited to a surface of circular cross-section but may include any tapered configuration, such as the oval one depicted herein.

Slideably mounted within the channel 18 and the groove 20 is a bar-shaped actuator 30. Actuator 30 is essentially rectangular and includes an angled camming slot 32 through its central portion.

Carried within the conical inner surface 24 of the plug insert 14 is a locking element 34. The locking element 34 is made of a tough but resilient plastic such as, for example, nylon. The upper end of the locking element 34 is a clevis 36 and is relatively narrow to fit to either side of the channel 18 and within recess 22. At the lower end 38 of the clevis 36, the locking element 34 widens into a conical skirt 40. The shape of skirt 40 conforms essentially to that of the conical inner surface 24 of the plug insert 14. The lower edge of skirt 40 is curved back upon itself to form a reentrant portion 42 terminating in an upwardly facing edge. The reentrant portion 42 overlaps the extension of the plug insert 14 carrying the ramp 44. The upper periphery of the ramp 44, at the shoulder 26, is wider than is its lower end. The locking element 34 which is illustrated also includes four expansion slots 46 which extend upwardly from the bottom of skirt 40. The locking element 34 is suspended from the actuator 30 by a pin 48 which is mounted in clevis 36 and extends through the slot 32 in the actuator 30.

OPERATION

Figure 3:
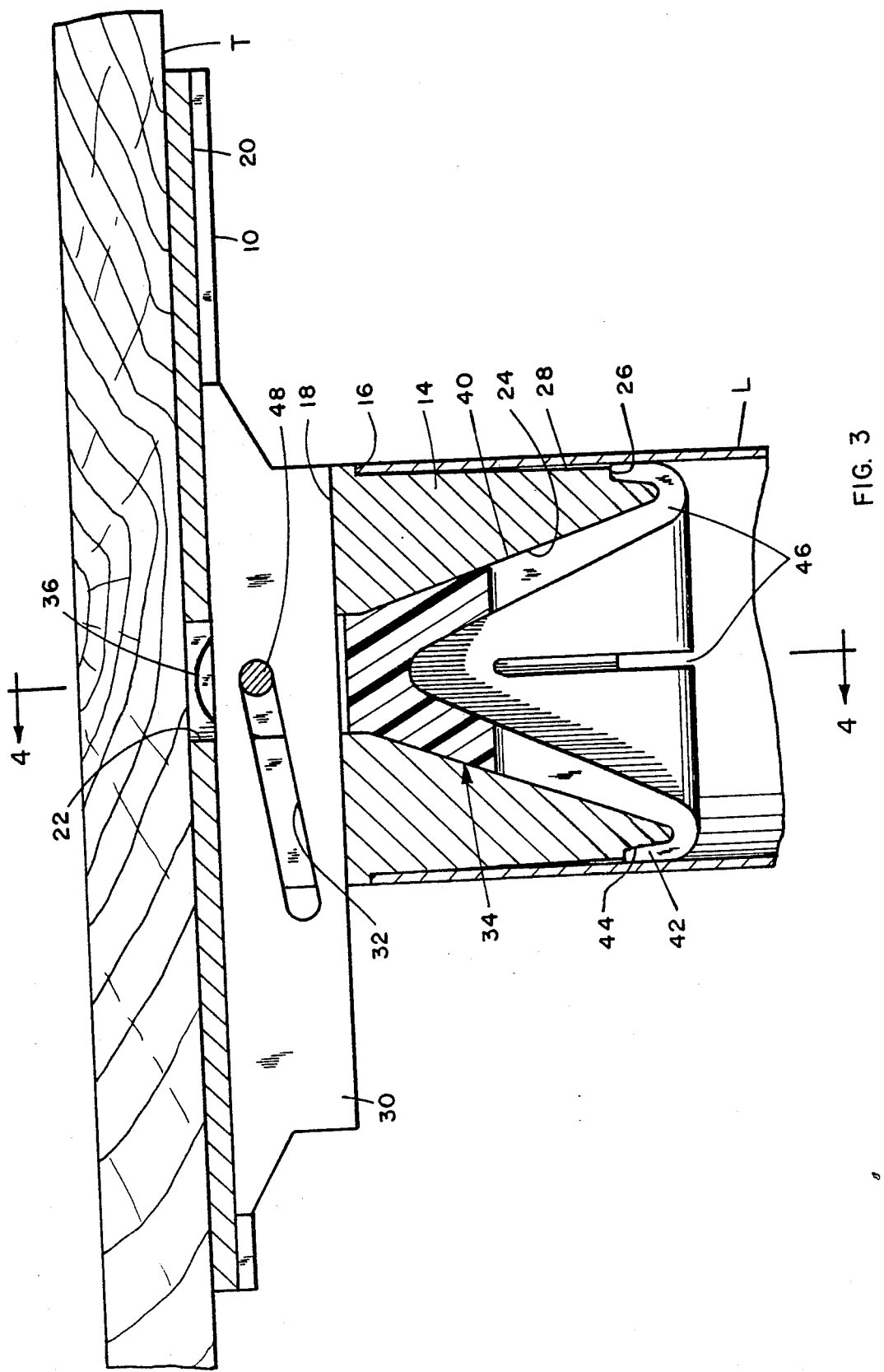
FIG. 3 is a view similar to FIG. 2, but showing the table leg and locking appparatus in their fully connected condition.
Figure 4:
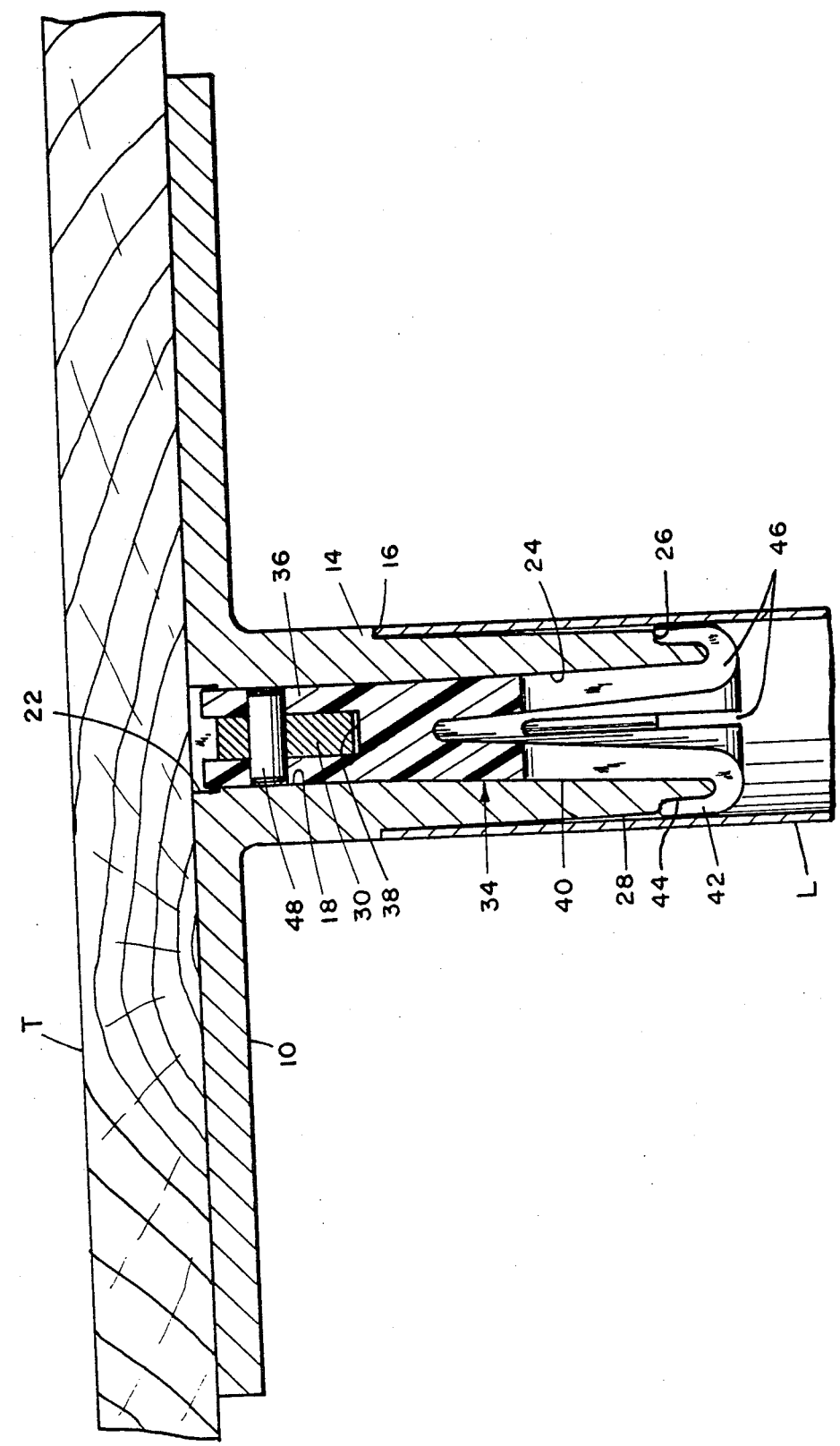
FIG. 4 is a cross-section taken substantially along the line 4—4 of FIG. 3.

FIG. 2 illustrates the assembly of the table top T to the leg L. As seen in FIG. 2, the actuator bar 30 is retracted to the right so that pin 48 is at the lowest end of the slot 32. This allows the locking element 34 to hang downwardly below the plug insert 14 and its extension carrying the ramp 44. In this condition, the plug insert 14 may be inserted into the tubular end of the leg L. When the upper end of the leg L has seated against the shoulder 16 of the plug insert 14, the actuator 30 is moved to the leftward position illustrated in FIG. 3. This maY be done, for example, by a hammer blow to the right end of the actuator 30. This forces the actuator into its leftward position illustrated in FIG. 3 and pulls the pin 48 upwardly, retracting the locking element 34 into the plug insert 14.

Upon retraction, the reentrant portion 42 of the locking element skirt 40 is pulled forcefully along the ramp 44 and against the shoulder 26 of the plug insert 14. This causes the resilient reentrant portion 42 to be forced outwardly and clamp tightly against the inner surface of the leg L, thereby locking the leg L rigidly into position and connecting it securely to the table top T.

To release the leg L from the table top T, it is merely necessary to reverse the foregoing procedure by a hammer blow against the left end of the actuator 30, returning it to the position illustrated in FIG. 2. In this position, the leg L is released.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. Apparatus for locking a leg having a longitudinal axis, a tubular top end, and a bottom end to a table top which comprises:
    a base member mountable to the underside of a table top including a tubular insert plug defining a rigid annulus and insertable into the top end of said leg and having a lower end adjacent an inner surface of the leg;
    a substantially annular resilient locking member carried by said base member and insertable into the tubular top end of said leg, said locking member comprising a ring having a radially inward side and an outer portion engageable with the lower end of said insert plug in proximity to the inner surface of the leg; and
    means fo selectively expanding said locking member outwardly into tight frictional engagement with the inner surface of said leg or relaxing said locking member to release said leg, said expanding and relaxing occurring in a plane substantially perpendicular to the axis of said leg.

2. The apparatus of claim 1 wherein said ring is substantially in the shape of a trough and said outer portion is a lip of the trough.

3. The apparatus of claim 2 wherein said expanding or releasing means comprises a locking element secured to the inward side of said trough-shaped ring and movable axially of said leg between an expansion and a releasing position.

4. The apparatus of claim 3 wherein said expanding or releasing means further comprises:
    a follower carried by said locking element; and
    camming means mounted on said base member and engaging said follower.

5. The apparatus of claim 4 wherein said follower is a pin and wherein said camming means is a slide bar movable substantially perpendicular to the axis of said leg between a first and a second position, said slide bar defining a ramp slot therein slidably engaging said follower pin.

6. Apparatus for releasably locking a leg having a tubular top end and a bottom end to a table top which comprises:
    a base plate mountable to the underside of a table top;
    a tubular insert plug having a first end carried by said base plate and a second end insertable into the top end of said table leg;
    a locking element having a first end carried by said base plate and a second end insertable into the top end of said table leg, said second end including a resilient reentrant portion adapted to bear against the second end of said tubular insert plug; and
    means for selectively positioning said locking element in either of
    (a) a retracted locking position wherein said resilient reentrant portion is forced against the second end of said tubular insert plug and urged resiliently outward by said plug to frictionally engage the inner surface of said table leg, and
    (b) a release position wherein said resilient reentrant portion is substantially disengaged from the second end of the tubular insert plug to release said table leg.

7. The apparatus of claim 6 wherein said selective positioning means comprises:
    a follower carried by said locking element; and
    camming means mounted on said base plate and engaging said follower.

8. The apparatus of claim 7 wherein said follower is a pin and wherein said cammig means is a slide bar movable parallel to said table top between a first and a second position, said slide bar defining a ramp slot therein slidably engaging said follower pin.

9. The apparatus of claim 8 wherein said locking element defines a clevis and said pin and slide bar pass through said clevis.

10. The apparatus of claim 9 wherein said base plate defines a groove retaining said slide bar.

11. The apparatus of claim 10 wherein said locking element is substantially conical in shape, the apex of the cone carrying said clevis and pin and the base of the cone being outwardly reentrant and shaped to conform to the inner surface of the tubular leg.

12. The apparatus of claim 11 wherein the side of said cone defines at least one expansion slot extending from its base in the direction of its apex.

13. The apparatus of claim 12 wherein the side of said cone defines a plurality of expansion slots.

* * * * *